US008807990B2

(12) United States Patent
Scott et al.

(10) Patent No.: US 8,807,990 B2
(45) Date of Patent: Aug. 19, 2014

(54) FURNACE EFFICIENCY TUNING DEVICE

(71) Applicant: Utilization Technology Development, NFP, Des Plaines, IL (US)

(72) Inventors: Shawn Matthew Scott, Mount Prospect, IL (US); Lawrence Brand, Davis, CA (US)

(73) Assignee: Utilization Technology Development, NFP, Des Plaines, IL (US)

( * ) Notice: Subject to any disclaimer, the term of this patent is extended or adjusted under 35 U.S.C. 154(b) by 0 days.

(21) Appl. No.: 13/693,106

(22) Filed: Dec. 4, 2012

(65) Prior Publication Data

US 2014/0154635 A1    Jun. 5, 2014

(51) Int. Cl.
*F23N 3/00*    (2006.01)

(52) U.S. Cl.
USPC ............ 431/20; 431/18; 126/292; 126/307 R; 110/163

(58) Field of Classification Search
USPC .............. 431/20, 6, 18; 126/292, 307, 307 R; 110/147, 163; 236/45
See application file for complete search history.

(56) References Cited

U.S. PATENT DOCUMENTS

| 1,837,581 | A | * | 12/1931 | Peterson | ....................... 126/312 |
| 4,141,495 | A | | 2/1979 | Diermayer | |
| 4,249,883 | A | | 2/1981 | Woolfolk | |
| 4,291,671 | A | * | 9/1981 | Senne | ........................... 126/292 |
| 4,499,891 | A | | 2/1985 | Seppamaki | |

OTHER PUBLICATIONS

Rahn, C. et al., "NOx Reduction from Implementing CO Based Combustion Control A Case Study", Texas Technology Showcase, Bambeck Systems, Inc., Santa Ana, CA Dec. 7, 2006.

* cited by examiner

*Primary Examiner* — Alfred Basichas
(74) *Attorney, Agent, or Firm* — Pauley Petersen & Erickson

(57) ABSTRACT

A gaseous fuel fired furnace having a vapor condensing flue gas vent conduit, a flue gas flow restrictor disposed in the vapor condensing flue gas vent conduit having a flue gas upstream side and a flue gas downstream side, and a condensate bypass conduit extending around the flue gas flow restrictor having a condensate inlet in fluid communication with the flue gas downstream side of the flue gas flow restrictor and a condensate outlet in fluid communication with the flue gas upstream side of the flue gas flow restrictor.

17 Claims, 2 Drawing Sheets

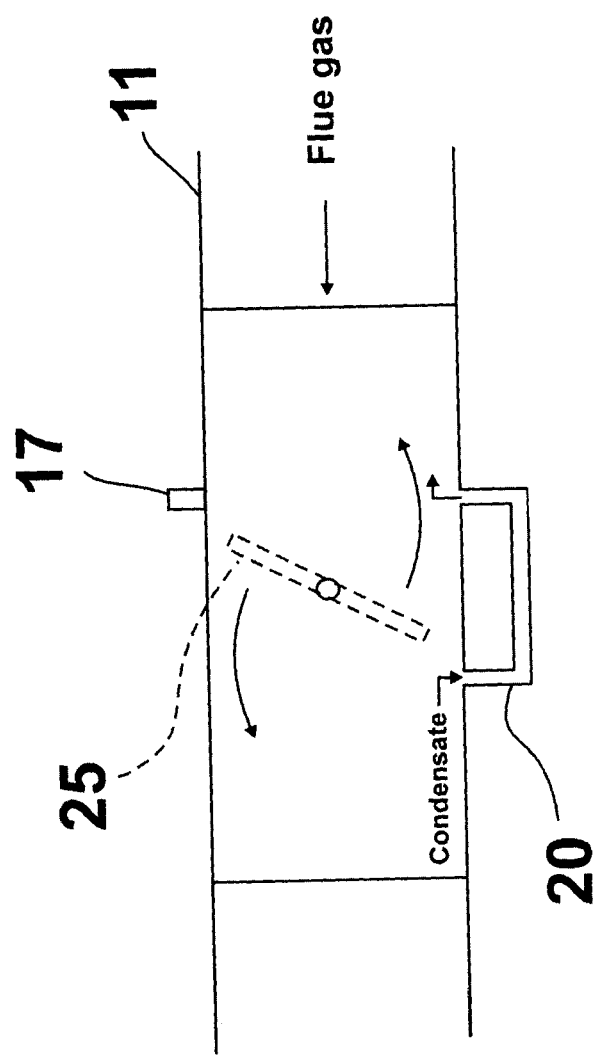

FURNACE EFFICIENCY TUNING DEVICE

BACKGROUND OF THE INVENTION

1. Field of the Invention

This invention relates to a device for increasing the efficiency of gaseous fuel fired furnaces. In one aspect, this invention relates to condensing gaseous fuel fired furnaces. In one aspect, this invention relates to the control of condensate formed during operation of the condensing furnace.

2. Description of Related Art

Residential furnaces are tested using a standard Annual Fuel Utilization Efficiency (AFUE) test to determine their efficiency with a standard comparison test that requires the furnace to be set up in a very specific configuration. The resulting efficiency number allows consumers to compare furnaces to each other on an equal basis; but it is not necessarily this efficiency at which the furnace will operate when installed in a home.

There are many factors that can affect the installed performance of gaseous fuel fired furnaces including geographic location, e.g., low altitude vs high altitude, ductwork installation and vent configuration. For example, as the length and number of elbows in the flue gas vent duct or conduit increase, the pressure drop increases, causing less air to be moved through the combustion process by the furnace combustion blower. When too much excess air is employed in the combustion process, the efficiency of the furnace decreases. The percent $CO_2$ decreases and the flue gas temperature rises as less energy is transferred to the process air, i.e. the air to be heated, and more energy is exhausted out the flue gas vent. Typically, the blower is sized by the furnace manufacturer to allow for a maximum vent length (combination of elbows and vent length). However, in practice, most furnaces are not installed near the maximum vent length, resulting in wasted energy that could be utilized by the furnace.

Furnaces are currently installed at whatever vent length is required to reach the desired exit from the home or other building. This may be a very short run or it may approach the maximum distance allowed by the manufacturer. Generally, furnaces installed with short vent runs are not as efficient as furnaces installed with long vent runs.

There are essentially two types of gaseous fuel fired furnaces—non-condensing furnaces in which the flue gas generated by the combustion process is exhausted out the chimney or vertical metal vent and condensing furnaces in which the flue gas is typically exhausted through a flue gas vent conduit extending through a wall of the building. With non-condensing furnaces, which tend to be lower efficiency furnaces, a significant amount of heat is expelled with the exhausted flue gas. With condensing furnaces, which are typically power-vented and high efficiency furnaces (greater than about 88% efficiency), the amount of heat extracted from the process is so high that water vapor in the flue gas condenses. As a result, condensing furnaces typically require some means for handling the condensate so as to avoid corrosion that may be caused by the highly acidic condensate.

Flue dampers have been around for a long time and have been installed on furnaces and boilers (See U.S. Pat. No. 4,249,883). The primary purpose of a flue damper is to stop furnace off-cycle energy losses as conditioned air is lost out the flue gas vent during furnace off-cycle times. Thus, dampers are used to close the flue gas vent when the furnace is off and they are typically wide open when the furnace is on.

It is known that automatically restricting flue gas flow of non-condensing furnaces having a non-power vented environment by adjusting the flue damper based on feedback from the combustion process can be used to obtain proper combustion. In addition, U.S. Pat. No. 4,499,891 teaches the use of a baffle mechanism to restrict the flue of a natural draft furnace to slow down the flue products as a way of increasing furnace efficiency.

SUMMARY OF THE INVENTION

It is one object of this invention to provide a method and apparatus for tuning condensing gaseous fuel fired furnaces to optimize furnace efficiency for a given installed location.

This and other objects of this invention are addressed by a condensing gaseous fuel fired furnace having a flue gas vent conduit, which furnace comprises an adjustable flue gas flow restrictor having a flue gas upstream side and a flue gas downstream side, which flue gas flow restrictor is operable for modifying an opening size of a flue gas opening for passage of flue gas in the flue gas vent conduit from the flue gas upstream side to the flue gas downstream side of the flue gas flow restrictor. The apparatus further comprises a condensate bypass conduit having a condensate inlet in fluid communication with the flue gas downstream side and a condensate outlet in fluid communication with the flue gas upstream side of the flue gas flow restrictor, which bypass conduit provides a condensate pathway separate from the flue gas opening for transmission of condensate from the flue gas downstream side to the flue gas upstream side. Beneficially, the apparatus of this invention requires only a one-time setting of the adjustable flue gas flow restrictor to restrict flue gas flow through the flue gas opening to maintain the furnace efficiency and vent opening at the desired level, even under varying condensate flow rates.

BRIEF DESCRIPTION OF THE DRAWINGS

These and other objects and features of this invention will be better understood from the following detailed description taken in conjunction with the drawings, wherein:

FIG. 2 is a schematic diagram of an apparatus in accordance with one embodiment of this invention employing a flue damper as an adjustable flue gas flow restrictor.

DETAILED DESCRIPTION OF THE PRESENTLY PREFERRED EMBODIMENTS

Figure 1:
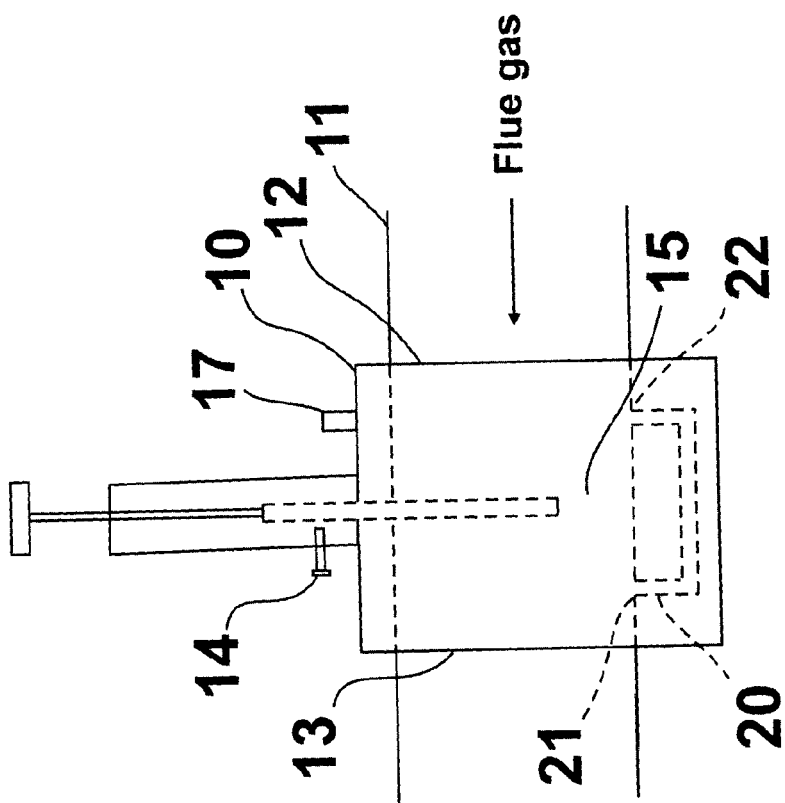
FIG. 1 is a schematic diagram of an apparatus in accordance with one embodiment of this invention employing a valve as an adjustable flue gas flow restrictor.

The invention described herein is an apparatus for tuning a condensing gaseous fuel fired furnace to increase its efficiency while maintaining safe combustion conditions. Efficiency of the furnace is increased by reducing the amount of excess air employed for combustion of the fuel by placing the apparatus in the flue gas vent conduit and using the apparatus to restrict flue gas flow in the flue gas vent conduit until a desired percent $CO_2$ or a desired flue gas temperature is measured.

It will be appreciated that condensate rates may vary depending upon various conditions as a result of which the effective size of the flue gas flow opening could change as various amounts of condensate flow back toward the furnace through the flue gas flow opening, thereby affecting the performance of the furnace. In addition, condensate may become trapped on various parts of the apparatus.

The apparatus of this invention allows for varying flue gas flow rates while maintaining the same flue gas flow opening size and maximizing efficiency by incorporating a condensate bypass pathway separate from the flue gas flow opening for transmitting the condensate on the flue gas downstream side of the apparatus to the flue gas upstream side of the apparatus. As used herein, the term "flue gas upstream side" as applied to the apparatus of this invention refers to the side of the apparatus facing the direction from which the flue gas is flowing and the term "flue gas downstream side" as applied to the apparatus refers to the side of the apparatus facing the direction in which the flue gas is flowing.

The apparatus of this invention is an improvement to a condensing gaseous fuel fired furnace having a flue gas vent conduit or duct, the improvement comprising an adjustable flue gas flow restrictor for use in tuning the furnace efficiency and a condensate bypass for controlling condensate formed by the furnace so as not to negatively impact furnace efficiency resulting from tuning of the furnace. The adjustable flue gas flow restrictor is operable for modifying an opening size of a flue gas opening for passage of flue gas. It is intended that once the flue gas flow restrictor has been installed and set to the desired furnace efficiency, further adjustment in the future should be unnecessary.

In accordance with one embodiment of this invention as shown in FIG. 1, the adjustable flue gas flow restrictor is a valve 10 connected with a flue gas vent duct or conduit 11. Although depicted as a gate valve, any valve that can be set by an installer to provide the desired percent $CO_2$ or temperature may be employed. Adjustment of the valve results in modifying the opening size of flue gas opening 15, thereby controlling flue gas flow from a flue gas upstream side 12 of the flue gas flow restrictor to a flue gas downstream side 13 of the flue gas flow restrictor. Once the desired opening size has been achieved, the valve may be secured, such as by a set screw 14, to ensure that the size of the opening remains constant during operation of the furnace. It will be appreciated that during routine maintenance of the furnace, the valve may be unsecured, thereby enabling adjustment as necessary.

In accordance with another embodiment of this invention as shown in FIG. 2, the adjustable flue gas flow restrictor comprises a flue gas damper 25 within the flue gas vent conduit 11. The flue gas damper is operable in a conventional manner to achieve the desired flue gas flow rate, at which point the flue gas damper is secured in place by any suitable means to prevent further, unwanted movement.

As previously indicated, furnace efficiency is tied, at least in part, to the amount of excess air employed for combustion of the gaseous fuel. The amount of excess air employed in the combustion process may be determined based upon a measurement of the percentage of $CO_2$ in the flue gas and the temperature of the flue gas in the flue gas vent conduit. For this purpose, the apparatus of this invention further comprises a measurement port 17 through which suitable instrumentation for measurement of the percent $CO_2$ in the flue gas and flue gas temperature may be inserted for making the necessary measurements. Instrumentation suitable for making such measurements is well known to those skilled in the art.

The standard vent installation for a condensing gaseous fuel fired furnace requires that the flue gas vent conduit slope back toward the furnace so as to allow the condensate formed in the conduit to flow back to the furnace. For the flue gas flow restrictor of this invention, condensate formed in the flue gas downstream side of the restrictor would naturally flow back toward the furnace, the effect of which would be varying the flue gas opening size depending upon the amount of condensate produced and flowing through the flue gas opening to the furnace. Such variations would, in turn, undesirably alter the operating efficiency of the furnace.

The improvement of this invention allows for varying flow rates while maintaining the same flue gas opening size and desired efficiency by employing a condensate bypass path from the flue gas downstream side of the adjustable flue gas flow restrictor to the flue gas upstream side thereof separate and apart from the flue gas opening. In accordance with one embodiment of this invention as shown in FIG. 1, the condensate bypass path or channel 20 having a condensate inlet 21 on the flue gas downstream side 13 of the flow restrictor 10 and having a condensate outlet 22 on the flue gas upstream side 12 of the flow restrictor is integral with the valve body of the valve, i.e., formed by the valve housing, thereby providing all of the features required for flue gas flow control and condensate bypass in one device. Alternatively, as shown in FIG. 2, the condensate bypass path or channel may be external to the flue gas flow restrictor. Because the flue gas vent conduit is sloped back toward the furnace, condensate on the flue gas downstream side of the flow restrictor flows through the condensate inlet into the condensate bypass channel and out of the bypass channel through the condensate outlet. It will be appreciated that the condensate bypass channel also works as a trap to maintain the same flue gas opening size while the furnace is operating. The dimensions, i.e. height and length, of the condensate bypass channel vary depending upon the operating parameters of the furnace. However, in all cases, the height of the bypass channel must be long enough to ensure that the furnace blower does not blow the condensate out of the bypass channel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a condensing gaseous fuel fired furnace having a flue gas vent conduit, the improvement comprising:
    an adjustable flue gas flow restrictor dividing said flue gas vent conduit between a flue gas upstream side and a flue gas downstream side, said flue gas flow restrictor operable for modifying an opening size of a flue gas opening for passage of flue gas in said flue gas vent conduit from said flue gas upstream side to said flue gas downstream side; and
    a liquid condensate bypass conduit having a condensate inlet in fluid communication with said flue gas vent conduit at said flue gas downstream side and a condensate outlet in fluid communication with said flue gas vent conduit at said flue gas upstream side, and providing a condensate pathway separate from said flue gas vent conduit and said flue gas opening for transmission of condensate from said flue gas downstream side to said flue gas upstream side.

2. The furnace of claim 1, wherein said adjustable flue gas flow restrictor is a valve.

3. The furnace of claim 2, wherein said condensate bypass conduit is formed by a housing of said valve.

4. The furnace of claim 3, wherein said valve comprises a measurement port for sampling said flue gas on said flue gas upstream side.

5. The furnace of claim 1, wherein said adjustable flue gas flow restrictor is a vent damper disposed in said flue gas vent conduit.

6. The furnace of claim 1, wherein said condensate pathway comprises a condensate trap.

7. In a condensing gaseous fuel fired furnace having a flue gas vent conduit, the improvement comprising:
- an adjustable flue gas flow restrictor disposed in said flue gas vent conduit, said flue gas flow restrictor having a flue gas upstream side and a flue gas downstream side; and
- a liquid condensate bypass conduit separate from said flue gas vent conduit and extending around said flue gas flow restrictor and providing condensate transport from said flue gas vent conduit at said flue gas downstream side to said flue gas vent conduit at said flue gas upstream side.

8. The furnace of claim 7, wherein said flue gas flow restrictor is a vent damper disposed in said flue gas vent conduit.

9. The furnace of claim 7, wherein said flue gas flow restrictor is a valve.

10. The furnace of claim 9, wherein said condensate bypass conduit is formed by a housing of said valve.

11. The furnace of claim 7, wherein said flue gas flow restrictor comprises a measurement port for sampling flue gas in said flue gas vent conduit on said flue gas upstream side.

12. A gaseous fuel fired furnace comprising:
- a vapor condensing flue gas vent conduit;
- a flue gas flow restrictor disposed in said vapor condensing flue gas vent conduit having a flue gas upstream side and a flue gas downstream side; and
- a condensate bypass conduit separate from said flue gas vent conduit and extending around said flue gas flow restrictor having a condensate inlet in fluid communication with said flue gas vent conduit at said flue gas downstream side and a condensate outlet in fluid communication with said flue gas vent conduit at said flue gas upstream side.

13. The furnace of claim 12, wherein said flue gas flow restrictor is adjustable based upon one or more operating conditions of the furnace.

14. The furnace of claim 13, wherein said flue gas flow restrictor is a vent damper disposed in said flue gas vent conduit.

15. The furnace of claim 13, wherein said flue gas flow restrictor is a valve.

16. The furnace of claim 15, wherein said condensate bypass conduit is formed by a housing of said valve.

17. The furnace of claim 12, wherein said flue gas flow restrictor comprises a measurement port for sampling flue gas in said flue gas vent conduit on said flue gas upstream side.

\* \* \* \* \*